United States Patent
Durgin et al.

(10) Patent No.: US 10,505,804 B2
(45) Date of Patent: *Dec. 10, 2019

(54) SYSTEM AND METHOD OF DISCOVERING PATHS IN A NETWORK

(71) Applicant: Fortinet, Inc., Sunnyvale, CA (US)

(72) Inventors: Cyrus John Durgin, Seattle, WA (US); Brett A. Holton, Seattle, WA (US); Kelly Ann Wanser, San Francisco, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/946,630

(22) Filed: Apr. 5, 2018

(65) Prior Publication Data
US 2018/0227181 A1    Aug. 9, 2018

Related U.S. Application Data

(63) Continuation of application No. 14/955,912, filed on Dec. 1, 2015, now Pat. No. 9,954,736.
(Continued)

(51) Int. Cl.
| | |
|---|---|
| *H04L 12/24* | (2006.01) |
| *H04L 12/707* | (2013.01) |
| *H04L 12/26* | (2006.01) |

(52) U.S. Cl.
CPC .......... *H04L 41/0836* (2013.01); *H04L 41/12* (2013.01); *H04L 43/12* (2013.01); *H04L 45/24* (2013.01)

(58) Field of Classification Search
CPC ..... H04L 41/0836; H04L 41/12; H04L 43/12; H04L 45/24
See application file for complete search history.

(56) References Cited

U.S. PATENT DOCUMENTS

| | | |
|---|---|---|
| 7,430,205 B2 | 9/2008 | Ota et al. |
| 7,602,787 B2 | 10/2009 | Cheriton |

(Continued)

FOREIGN PATENT DOCUMENTS

WO    2016/089921    6/2016

OTHER PUBLICATIONS

Non-Final Rejection for U.S. Appl. No. 14/955,939 dated May 26, 2017.

(Continued)

*Primary Examiner* — Benjamin H Elliott, IV
(74) *Attorney, Agent, or Firm* — Jaffery Watson Mendonsa & Hamilton, LLP

(57) ABSTRACT

Systems and methods for discovering, testing, and optimizing paths in a network are provided. According to one embodiment, configuration data of a first and second packet forwarding device is obtained by a first and second agent associated with the first and second packet forwarding devices, respectively. Existence of multiple of equal cost links coupling the first and second packet forwarding devices is discovered by a network controller based on the configuration data. For each equal cost link, the network controller then identifies a performance metric and a type of packet transported by the equal cost link by: (i) probing the equal cost link from one side with a variety of test data having different packet characteristics; (ii) recording receipt of the test data on the other side; and (ii) determining the performance metric based on the received test data and timestamps contained within the received test data.

20 Claims, 13 Drawing Sheets

Related U.S. Application Data

(60) Provisional application No. 62/086,164, filed on Dec. 1, 2014.

(56) References Cited

U.S. PATENT DOCUMENTS

| | | | |
|---|---|---|---|
| 8,885,493 | B2 | 11/2014 | Sundaram et al. |
| 9,246,805 | B2 | 1/2016 | Yoneyama et al. |
| 9,359,631 | B2 | 5/2016 | Matthews et al. |
| 9,407,450 | B2 | 8/2016 | Singh |
| 9,411,787 | B1 | 8/2016 | Lad et al. |
| 9,954,736 | B2 * | 4/2018 | Durgin ............... H04L 41/0836 |
| 2003/0212941 | A1 | 11/2003 | Gillies et al. |
| 2005/0207411 | A1 | 9/2005 | Ota et al. |
| 2006/0104286 | A1 | 5/2006 | Cheriton |
| 2007/0088834 | A1 | 4/2007 | Litovski et al. |
| 2007/0268909 | A1 | 11/2007 | Chen et al. |
| 2009/0185501 | A1 | 7/2009 | Huang et al. |
| 2010/0071024 | A1 | 3/2010 | Eyada |
| 2010/0281051 | A1 | 11/2010 | Sheffi et al. |
| 2011/0261706 | A1 | 10/2011 | Fujiwara et al. |
| 2013/0022042 | A1 | 1/2013 | Vasseur et al. |
| 2013/0088959 | A1 | 4/2013 | Kamath et al. |
| 2013/0259054 | A1 | 10/2013 | Yoneyama |
| 2013/0297768 | A1 | 11/2013 | Singh |
| 2013/0311832 | A1 | 11/2013 | Lad et al. |
| 2014/0019203 | A1 | 1/2014 | 5Undaram et al. |
| 2014/0056317 | A1 | 2/2014 | Sanders et al. |
| 2014/0112130 | A1 | 4/2014 | Yang et al. |
| 2014/0161131 | A1 | 6/2014 | Yang et al. |
| 2014/0258524 | A1 * | 9/2014 | Thyni ............... H04L 43/0852 709/224 |
| 2014/0337497 | A1 | 11/2014 | Wanser et al. |
| 2015/0092591 | A1 | 4/2015 | Matthews et al. |
| 2015/0281028 | A1 | 10/2015 | Akhter et al. |
| 2016/0080269 | A1 | 3/2016 | Akiya et al. |
| 2016/0164734 | A1 | 6/2016 | Durgin et al. |
| 2016/0164741 | A1 | 6/2016 | Durgin et al. |
| 2016/0021017 | A1 | 9/2016 | Thubert et al. |
| 2017/0063705 | A1 | 3/2017 | Gilson et al. |
| 2017/0272693 | A1 | 9/2017 | Strein |
| 2017/0302580 | A1 | 10/2017 | Luo et al. |
| 2018/0227181 | A1 * | 8/2018 | Durgin ............... H04L 41/0836 |

OTHER PUBLICATIONS

Notice of Allowance for U.S. Appl. No. 14/955,912 dated Feb. 9, 2018.

Non-Final Rejection for U.S. Appl. No. 14/955,912 dated Jun. 6, 2017.

* cited by examiner

FIG. 3    DiffServ Aware Path Selection

SYSTEM AND METHOD OF DISCOVERING PATHS IN A NETWORK

RELATED APPLICATIONS

This application is a continuation of U.S. patent application Ser. No. 14/955,912, filed Dec. 1, 2015, now U.S. Pat. No. 9,954,736, which claims the benefit of priority of U.S. Provisional Application No. 62/086,164, filed Dec. 1, 2014, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014-2018, Fortinet, Inc.

BACKGROUND

Field

Embodiments of the present invention relate generally to data networking and more particularly to discovering and/or optimizing paths in a data network.

Description of the Related Art

A network may take advantage of a network topology that includes an equal cost segment group from one endpoint in the network to another endpoint. This equal cost segment group allows network connections to increase throughput and provide redundancy in case a link in the equal cost segment group goes down. An equal cost segment group can be an aggregation of links from one network device connected to another device or a collection of multiple link paths between network devices. An example of an equal cost segment group is an Equal Cost Multipaths (ECMP) and Link Aggregation Groups (LAG).

A problem with equal cost segments is that the link selection is proprietary and hidden from the network device configuration. This means that a network operator does not have visibility into which type of data uses which of the links available in an equal cost segment group. Each LAG or ECMP configuration appears as a single logical entry in a Forwarding Information Base (FIB) or Routing Information Base (RIB) of the network element. For example, if a LAG includes four links (Links A, B, C, D) between two network elements, which type of data is used for each link depends on the link selection mechanism of the network element transmitting the data. Data destined for one node may be transmitted on Link B, whereas data sourced from another node may be transmitted on Link D. A network element selects which link of an equal cost segment based on the characteristics of the data packet being transmitted. Each network element may have a proprietary selection mechanism and this selection mechanism may vary by device, vendor, or other criteria.

Because a network operator does not know, a priori, which links will be used for which types of data, it is difficult to design a network so that the network can be used efficiently. For example, general best effort web data may be selected to use the same link of an equal cost segment group as latency sensitive data used for a high-speed trading service. It would be useful to probe an equal cost segment group to determine which type of data uses which links. In addition, it would be useful to monitor these links to determine if performance of one of the links is deteriorating before other links of the equal cost segment group. Furthermore, it would be useful to optimize path(s) between clients of a service and that service so as to assign certain links of an equal cost segment and the performance of that service is improved.

SUMMARY

Systems and methods are described for discovering, testing, and optimizing paths in a network. According to one embodiment, configuration data of a first and second packet forwarding device of a network is obtained by a first and second agent associated with the first and second packet forwarding devices, respectively, on behalf of a network controller of the network. Existence of multiple of equal cost links coupling the first and second packet forwarding devices is discovered by the network controller based on the configuration data. For each equal cost link, the network controller then identifies a type of packet the equal cost link is used to transport and a performance metric of the equal cost link by: (i) causing the first packet forwarding device to probe the equal cost link with a variety of test data having different packet characteristics; (ii) causing the second agent to record receipt of the test data by the second packet forwarding device; and (ii) determining the performance metric based on the received test data and timestamps contained within the received test data.

Other features of embodiments of the present disclosure will be apparent from accompanying drawings and from detailed description that follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
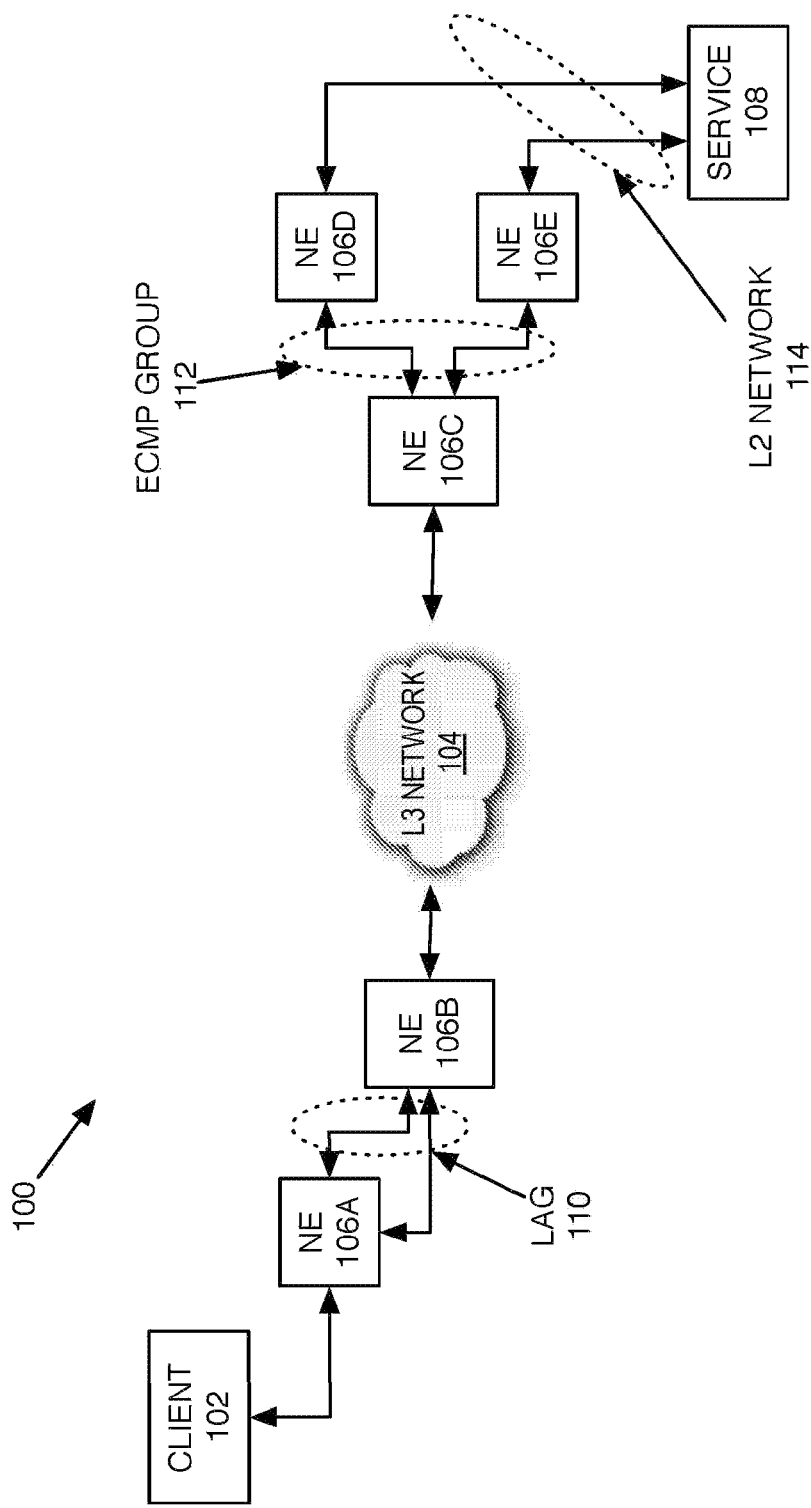
FIG. 1 is a block diagram of a network that includes multiple paths between a client and a service in accordance with an embodiment of the present invention.

A method and apparatus that discovers, tests, and optimizes paths in a network is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus that discovers, tests, and optimizes paths in a network is described. In one embodiment, a device discovers an equal cost segment group between two endpoints in the network, where the equal cost segment group include equal cost segments that each has the same cost to transport data as these other equal cost segments. An equal cost segment group can be a collection of single links or a collection of multi-link segments. How a network element selects a link to use for an equal cost segment group is not evident from the forwarding configuration stored in a forwarding information base (FIB) or routing information base (RIB). This is because an equal cost segment group is treated as a single logical entry in the FIB or RIB and the selection mechanism used by to select a link to transmit data is proprietary to the network element. In one embodiment, a network element selects which link to use in an equal cost segment group based on the packet characteristics of the data being transmitted. An example of an equal cost segment is an Equal Cost Multipath (ECMP) or a Link Aggregation Group (LAG).

The device further probes the equal cost segment group by generating a variety of test data that will be used to transmit using the equal cost segment group. The generated test data has different packet characteristics that probe the equal cost segment group link selection of a network element that transmits the test data. In one embodiment, generated test data varies in packet characteristics, such as source and destination address, source and destination port address, VLAN tag, VxLAN tag, Differentiated Services Code Point (DCSP) bits, and/or other types of packet characteristics. The device further injects this test data so that a network element transmits the test data using equal cost segment group. The device collects that results of the test data injection to determine which of the equal cost segments are used by which test data.

In one embodiment, by determining which the equal cost segments are used for which type of data, the device determines paths across the equal cost segment group for different types of data. With this knowledge, the device can further test each of the equal cost segments in the group to determine the performance of each of the equal cost segments. Selectively testing one or more of the equal cost segments in the group allows for a finer granularity of testing the performance of the group. This is useful, for example, to test if the performance of one of equal cost segments deteriorates even though the overall performance of the equal cost segment group remains acceptable.

In a further embodiment, the device can optimize a path for data that traverses an equal cost segment group. In this embodiment, the device identifies a priority for a path that traverses an equal cost segment group. The device can optimize higher priority paths to traverse equal cost segment of a group that are reserved for this and/or other high priority paths. Alternatively, the device can adjust the configuration of lower priority paths so that these paths do not share some of the equal cost segments of a group with a high priority path. In one embodiment, the device sends instructions to one or more agents to implement the path optimization.

FIG. 1 is a block diagram of one embodiment of a network 100 that includes multiple paths between a client and a service. In FIG. 1, network 100 includes a client 102 that communicates data with a service 108 over one or more of the multiple paths of the network 100. In one embodiment, client 102 is a device that utilizes the service 108 and can be a personal computer, mobile device, etc., or any other type of device that can communicate data over on the network 100. In this embodiment, the service 108 is a network service is an application communicating on a network that provides data storage, manipulation, presentation, communication or other capability using network protocols. In one embodiment, there are multiple paths in network 100 that are available for the client 102 to communicate data with the service 108.

In one embodiment, the network 100 includes network elements 106A-E, where each of the network elements 106A-E is a device that receives and forwards data using one or more network protocols. For example and in one embodiment, a network element 106A-E is a device that provides network access to a network (e.g., physical network, virtualized network, etc.). A network element can be a switch, router, hub, bridge, gateway, etc., or any type of device that can allow access to a network. While in one embodiment, the interconnection between the different network elements is a wired connection (e.g., copper, fiber, etc., and/or a combination thereof), in alternate embodiments, a different type of interconnection is used (e.g., wireless, a combination of wireless and wired, etc.).

In one embodiment, the client 102 couples to network element 106A, which is further coupled to network element 106B via a link aggregation group 110. In one embodiment, the link aggregation group (LAG) 110 is a group of two or more links between network elements that are logically grouped into a single logical link. The LAG is an example of an equal cost segment group. In addition, network element 106B couples to network element 106C across layer-3 network 104. In one embodiment, a layer-3 network routes data using layer-3 information of the data (e.g., the destination Internet Protocol (IP) address of a packet).

Network element 106C further couples to network elements 106D-E with an equal cost multipath (ECMP) group 112. In one embodiment, the ECMP group 112 is a is a routing strategy where next-hop packet forwarding to a single destination can occur over multiple "best paths" which tie for a top place in routing metric calculations. Many different routing protocols support ECMP (e.g., Open Shortest Path First (OSPF), Intermediate System to Intermediate System (ISIS), Border Gateway Protocol (BGP), and any other type of routing protocol). ECMP can allow some load balancing for data packets being sent to the same destination, by transmitting some data packets through one next hop to that destination and other data packets via a different next hop. Each of the network elements 106D-E couples to the service 108 across layer-2 network 114. Thus, the ECMP group includes two segments: (i) network element 106C⇔network element 106E⇔service 108 and (ii) network element 106C⇔network element 106F⇔service 108.

As described above, there are multiple possible paths in the network 100 that the client 102 and service 108 can use to communicate data between each other. For example and in one embodiment, the client 102 can communicate data with the service 108 using one path via network element 106A over LAG 110 to network element 106B. Network element 106B further communicates the data over layer-3 network 104 (e.g., IP routing) with network element 106C. Network element 106 selects one of the links of the ECMP group 112 to communicate the data to either network elements 106C-E, which communicates the data to the service 108.

In FIG. 1, there are multiple paths the devices of the network can use. However, it is hard to discover the links each path uses, especially if the path traverses an equal cost segment group, such as the LAG 110 or ECMP group 112. In one embodiment, an equal cost segment is a segment of a network that includes an equal cost segment group between two different nodes of the network. An equal cost segment group can be a collection of single links (e.g., LAG group 110) or a collection of multi-link segments (e.g., ECMP group 112). How a network element selects a link to use for an equal cost segment group is not evident from the forwarding configuration stored in a forwarding information base (FIB) or routing information base (RIB). This is because an equal cost segment group is treated as a single logical entry in the FIB or RIB and the selection mechanism used by to select a link to transmit data is proprietary to the network element. In one embodiment, a network element selects which link to use in an equal cost segment group based on the packet characteristics of the data being transmitted. For example and in one embodiment, a network element hashes certain packet characteristics to determine which link to use. How the hash works is not discoverable by interrogating a network element's configuration. In one embodiment, a path is a series of one or more links between two end devices in the network and the protocols used to communicate data on that link. A path may communicate data using more than one protocol along the path.

In one embodiment, each of the network elements 106A-E includes an agent (not illustrated) that discovers information regarding that network elements. This information can be collected and used to discover different paths between the client 102 and service 108. In another embodiment, the agent for a network element 106A-E runs on a different device, but acts as a proxy for that network element. Discovering the paths is further described in FIGS. 2 and 5. In one embodiment, the discovered paths can be probed as described in FIG. 6 below. Furthermore, the discovered paths can be optimized as described in FIGS. 3 and 7 below.

Figure 2:
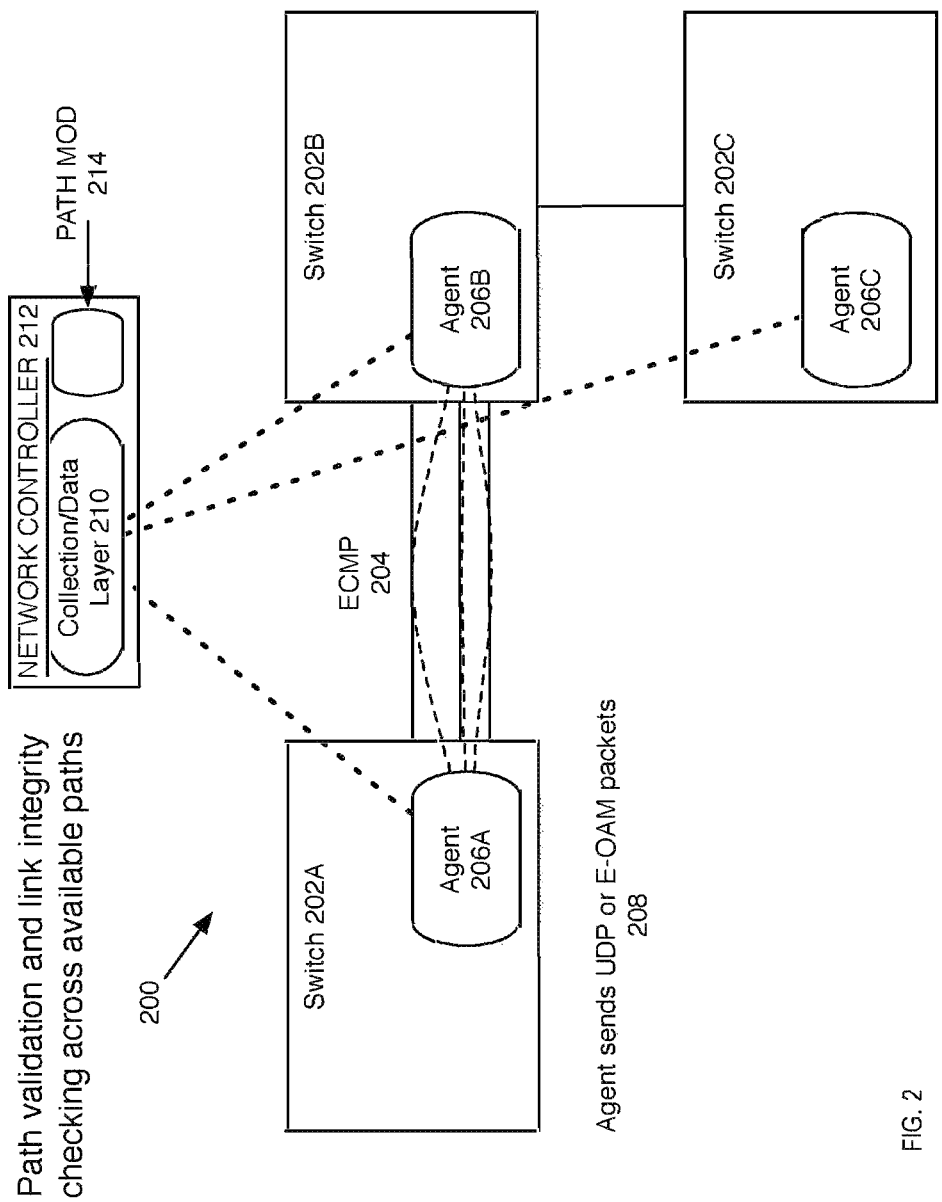
FIG. 2 is a block diagram illustrating path validation and link integrity checking of available paths in a network in accordance with an embodiment of the present invention.

FIG. 2 is a block diagram of one embodiment of path validation and link integrity checking available paths in a network 200. In FIG. 2, the network 200 includes switches 202A-C, where switch 202A couples to switch 202B via an ECMP group 204, and switch 202B couples to switch 202C via link 212. In one embodiment, a link is a connection between network elements. The link can be a wired connection (e.g., copper, fiber, or another type of physical wired connection), or a wireless connection. In this embodiment, each of the switches 202A-C includes a corresponding agent 206A-C. Each agent 206A-C collects configuration data from the corresponding switch 202A-C and reports this data to the collection/data layer 210. For example and in one embodiment, the agent 206A collects configuration data of switch 202A, where the configuration data can include the hardware configuration of the switch 202A (e.g., number and type of ports, number of currently connected links, number and type of installed linecards, and/or other types of hardware configuration information) and the software configuration of switch 202A (e.g., routing information base (RIB), forwarding information base (FIB), access control lists (ACL), quality of service (QoS) information, virtual device configuration, service configuration(s), network address translation configuration, security configuration, performance metrics, and/or other types of software configuration). In one embodiment, an agent 202A-C can subscribe to changes made in the configuration of the corresponding network element. For example and in one embodiment, if there is a change in the configuration for switch 202A (e.g., forwarding information update, security configuration update, hardware change, or another type of update), the agent 206A that subscribes to this change will be notified as the change is made (or soon thereafter). The agent 206A forwards this change to the collection/data layer 210. In one embodiment, the agents 206A-C sends the configuration data to the collection/data layer 210 using User Datagram Protocol (UDP) or Ethernet operations, administration and maintenance (E-OAM) packets 208.

In one embodiment, the collection/data layer 210 receives the configuration data from each of the agents 206A-C and assembles this information so as to discover paths that are available in the network 200. In one embodiment, the collection/data layer 210 determines the paths by determining the available links between the devices in the network 200. For example and in one embodiment, the collection/data layer 210 determines that there are ECMP links between the switch 202A-B and link 212 between switches 202B-C. Using the link information, the collection/data layer 210 determines the path between switches 202A and 202C using ECMP 204 and link 212 via switch 202B. In one embodiment, the collection/data layer 210 is part of a network controller 212. In one embodiment, the network controller 212 includes a path module 214 that includes and/or performs the function of the collection/data layer 210. In another embodiment, each agent 206A-C includes a path module 214 (not illustrated) that can perform the function of the collection/data layer 210

Decisions about which ECMP link (or equivalently, which link of a LAG group) to use for which type of data is not a configuration that is accessible from a network element's configuration data. For example and in one embodiment, even though an ECMP or LAG group can include a large number of links to use, an ECMP group or LAG group is treated as a single logical entry in a Routing Information Base (RIB) or Forwarding Information Base (FIB). Determination of which link is used by one of these groups is a proprietary function of the network element. For example, a network element may hash information in each data packet, such as destination address, source address, port, VLAN characteristics, Ethernet information, protocol information, and/or other types of packet characteristics. Based on the hash value, the network element decides which link of an ECMP or LAG group to use for transmission.

In one embodiment, the collection/data layer 210 can identify which links are used for which type of data by testing the links with a variety of test data across the equal cost segment groups of the network. In this embodiment, for an equal cost segment group, the collection/data layer 210 instructs an agent associated with a network element connected to the equal cost segment group to inject test data to be transmitted on the equal cost segment. The collection/data layer 210 further instructs the agent on the other end(s) of the equal cost segment group to determine which link of the equal cost segment receives the test data. in one embodiment, the agent can use a sampling program (e.g., sflow or some other type of sampling program) in conjunction with interface counters to passively measure link utilization by flow type. In another embodiment, an agent can discover an equal cost segment group and initiate the testing of the equal cost segment group by coordinating the testing of the equal costs segment group with other agents.

In one embodiment, the agent initiating the transmission of the test data creates a variety of the test data that is used to test the equal cost segment selection mechanism. In this embodiment, the agent creates the test data by varying different characteristics such as source address, destination address, port, and/or another type of packet characteristic. By creating this test data, the agent probes the link selection mechanism of the network element for an equal cost segment group. The agent injects the test traffic into the network element, which the network element transmits using the equal cost segment group. The agent(s) at the other end of the equal cost segment group records the receipt of the traffic on one of more the receiving end of the equal cost segment group. This data can be used by the receiving agent (or reported to the collection/data layer 210) to determine which type of traffic is transmitted on which segment of an equal cost segment group.

For example and in one embodiment, in FIG. 2, the ECMP 204 is an equal cost segment group between switches 202A-B. The collection/data layer 210 instructs the agent 206A to initiate a test of the ECMP group 204 to determine which types of data are used on the three different links of the ECMP group 204. The agent 206A creates a variety of test data that is used to test the ECMP link selection mechanism of switch 202A. The agent 206A injects the test data that the switch 202A transmits on the ECMP group 204 using one of the links of that group 204. The agent 206B records the receipt of the test data on switch 206B. Based on which type of test data is transmitted across which link of the ECMP group 204 will indicate the type of data is selected for each of the ECMP group 204 links. The agent 206B reports the results of the discovery to the collection/data layer 214. In another embodiment, the agent 206A discovers the ECMP group 204 and starts the testing of the ECMP group 204 using a variety of test data. In this embodiment, the agent 206A communicates with the agents 206B to coordinate the ECMP group 204 link discovery by indicating that the agent 206B should detect receipt of test data and report the results to the agent 206A and/or the collection/data layer 216.

Figure 3:
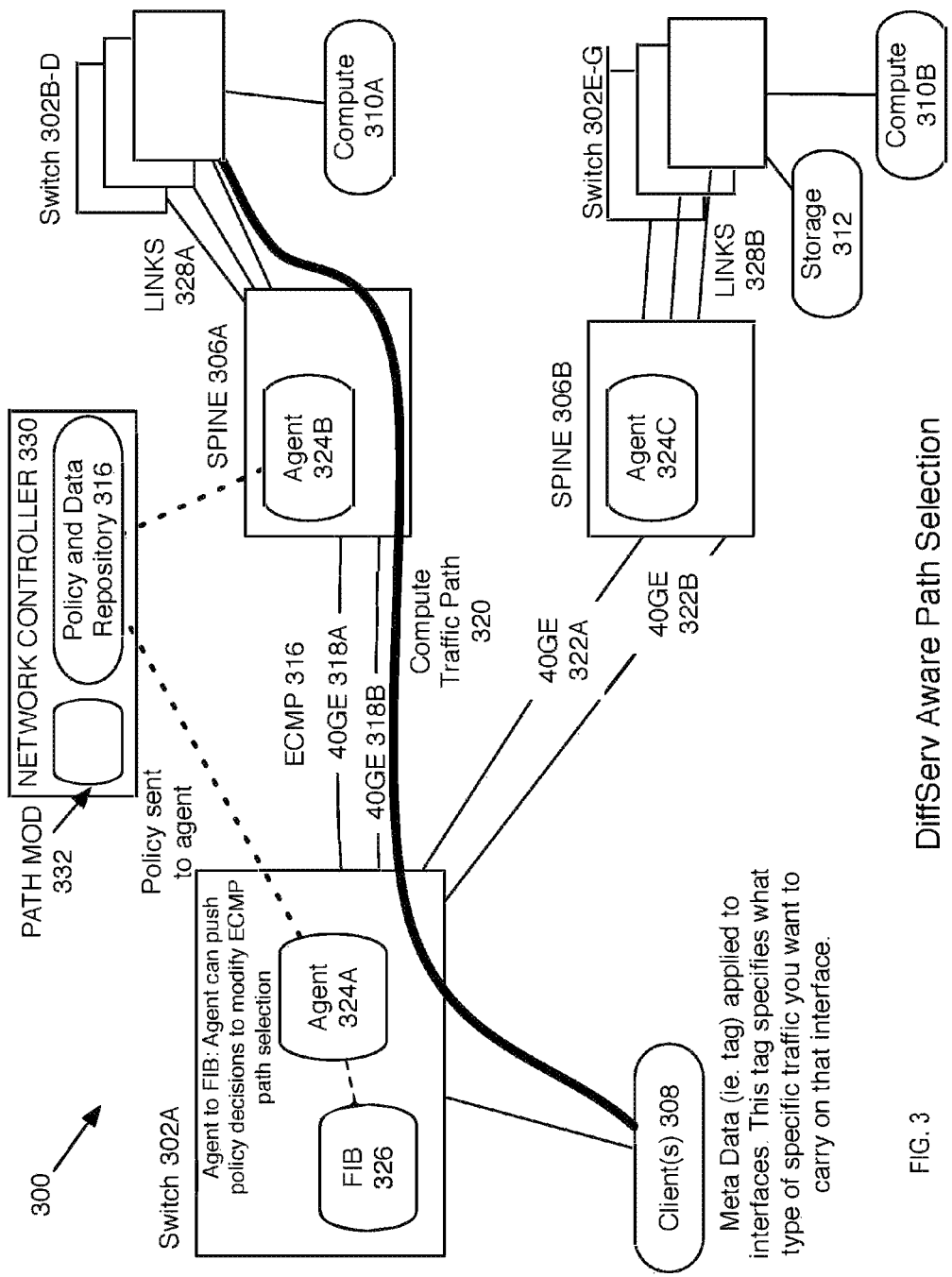
FIG. 3 is a block diagram illustrating path selection in a network in accordance with an embodiment of the present invention.

FIG. 3 is a block diagram of one embodiment of path selection in a network 300. In FIG. 3, client(s) 308 couple to switch 302A via link 326 to access a compute node 310A for one or more services that compute node 310A can provide the client(s) 308. For example and in one embodiment, the compute node 310A can provide a database or application server service. In one embodiment, the client(s) 308 can be device that communicates data on the network 300 and may utilize the compute nodes 310A-B, and/or storage node 312. Switch 302A couples to spine network element 306A across an ECMP 316 that includes two 40-gigabit Ethernet links 318A-B between switch 302A and spine 306A. In addition, switch 302A couples to spine network element 306B via two 40-gigabit Ethernet links 322A-B. While in one embodiment, the ECMP group 316 is illustrated using two 40-gigabit Ethernet links, in alternate embodiments, the ECMP group 316 can include a greater number of links and/or different types of links. Spine network element 306A further couples to switches 302B-D over links 324A-C. In one embodiment, spine network element 306-BA is a network element (e.g., router, switch, or other type of network element) that couples to other network elements. Switches 302B-D couple to compute node 310A, which is a node that provide a compute service to the client(s) 308 (e.g., high-speed trading service, software as a service (SaaS), and/or another type of service. In addition, spine network element 306B further couples to switches 302E-G over links 326A-C. Switches 302E-G couple to compute node 310B and storage node 312. In one embodiment, a storage node 312 provides a storage service for the client(s) 308.

In FIG. 3, the switch 302A and spines 306A-B include an agent 324A-C. As described in FIG. 2 above, each agent 324A-C collects configuration data from the corresponding switch 302A or spines 306A-B and reports this data to the collection/data layer of the network controller 330.

In addition to the data collection, the agents 324A-C are each coupled to the policy and data repository layer 316. In one embodiment, the policy and data repository layer 316 constitutes the prescriptive element of the network state, where one or more administrators specify the configuration or policies they wish to enforce and the controller orchestrates this configuration across nodes and agents. In another embodiment, the policy and data repository layer 316 determines policy changes for one or more of the agents 324A-C and sends these changes to the relevant agent. In this embodiment, the policy and data repository layer 316 determines changes to the configuration of the network element(s) in the network 300 and sends the relevant changes to an agent that corresponds that the network element that will have the configuration change.

In one embodiment, the policy and data repository layer 316 can optimize paths in the network 300 and send the changes for the optimization to the relevant agents for implementation on the corresponding network element. In this embodiment, the policy and data repository layer 316 determines forwarding decisions for the path, if the path includes equal cost segment group that arrive at the same destination. For example and in one embodiment, a path between client(s) 308 to the compute node 310A is from client(s) 308 to switch 302A via spine 306A to switches 302B-D and to compute node 310A. In this example, this path can have several different possible options for the data being communicated between client(s) 308 and compute 310A. This is because the path has an ECMP group 316 between switch 302A and the spine 306A. The ECMP group 316 includes two 40-gigabit Ethernet links 318A-B that can either be used for the path. In addition, there are three links between the spine 306A and switches 306B-D that can also be used to communicate data. In this example, there are six possibilities for the path between the client(s) 308 and compute node 310A.

In one embodiment, the policy and data repository layer 316 determines one of the six possibilities for the path and optimizes the forwarding policies on each of the affected network elements. In this embodiment, the policy and data repository layer 316 selects one of the links of the ECMP group 316 and one of the spine 306A-switch 302B-D links to be used for the path data. Using the selected links, the policy and data repository layer 316 sends an instruction to each of the relevant agents to configure the links to use for the data communicated between the client(s) 308 and the compute node 310A. For example and in one embodiment, the policy and data repository layer 316 sends an instruction to the agent 324A to configure switch 302A to forward data from client(s) 308 to compute node 310A using the 40-gigabit Ethernet link 318B. In addition, the policy and data repository layer 316 instructs agent 324B to forward this path data to switch 302D. In response, each of these agents 324A-B makes device configuration changes to the forwarding information for switch 302A and spine 306A, respectively. In this example, agent 324A modifies the ECMP path selection so that the forwarding information base of switch 302A will forward data from the client(s) 308 to compute node 310A using the ECMP 40-gigabit Ethernet link 318B. Furthermore, agent 324B modifies the forwarding information base of spine 306A to forward data from the client(s) 308 to the compute node 310A to forward the data to switch 302D. Additionally, the agent 324B modifies the ECMP path selection so that the forwarding information base of spine 306A will forward data from the compute node 310A to client(s) 308 using the ECMP 40-gigabit Ethernet link 318B. In one embodiment, by implementing the changes of the policy and data repository layer 316, the client(s) 308 and compute node 310A communicate data between them using the compute traffic path 320. In one embodiment, a network controller 330 includes the policy and data repository 316. In one embodiment, the network controller 330 includes a path module 332 that includes the policy and data repository 316 and/or performs the functions of the policy and data repository 316. In one embodiment, each of the agents 324A-C includes a path module 332 (not illustrated).

In one embodiment, the data communicated between the client(s) 308 and the compute node 310A is tagged so that the data can be differentiated by either the switch 302A or spine 306A. For example and in one embodiment, the communicated data is tagged using the Differentiated Services Code Point (DSCP) field in Internet Protocol (IP) packets that is used to transport the communicated data. In this example, the DSCP field can be used by the network elements (e.g., switch 302A and spine 306A) to make forwarding decisions regarding the data. For example and in one embodiment, the 40-gigabit Ethernet link 318B can be reserved for the "assured forwarding" class of data and the 40-gigabit Ethernet link 318A is used for "best effort." In this example, the data communicated between the client(s) 308 and the compute node 310A is tagged with a "assured forwarding" tag so that this data gets forwarded on the 40-gigabit Ethernet link 318B. It is important to note that this type of forwarding is policy-based forwarding where a type of data is forwarded out different links of the network element based on a class the data matches. This is different from a queuing-based transmission mechanism, which determine which data to send out one interface based on the tagging of the data such as used in Quality of Service type queuing. Thus, the forwarding is selection of an interface to send the data based on data tagging (e.g., policy-based forwarding) as opposed to when to transmit data based on the data tags (e.g., queuing-based data transmission). In another embodiment, different types of data tags can be used to the make the forwarding decisions (e.g., Virtual Local Area Network (VLAN) tags, Virtual eXtension Local Area Network (VxLAN), and/or other types of data tags that can be used to make forwarding decisions). In one embodiment, policy-based routing decisions use the path discovery of equal cost segment groups to modify or optimize discovered paths.

Figure 4:
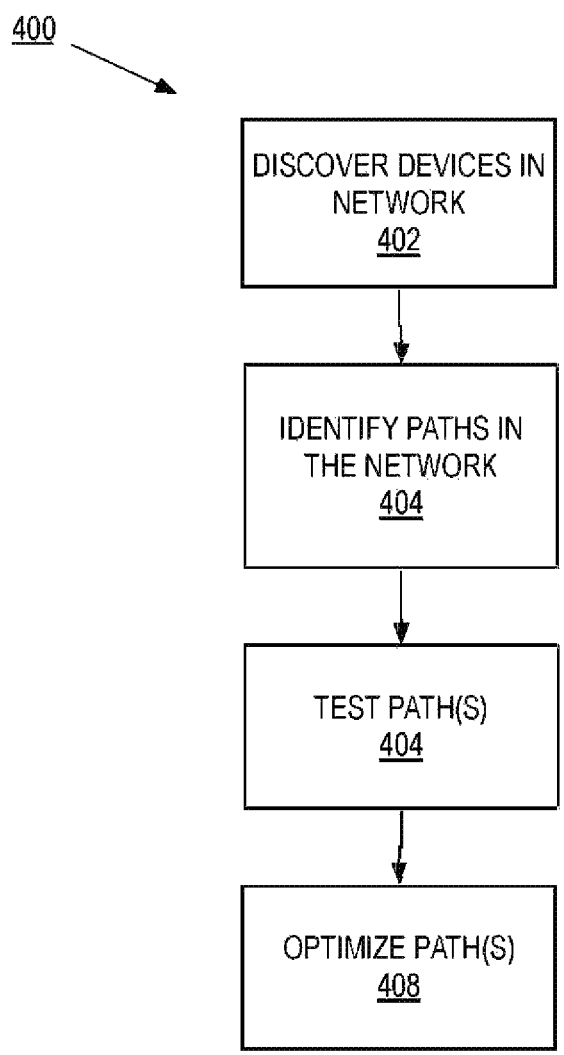
FIG. 4 is a flow diagram illustrating a process to discover and optimize paths in a network in accordance with an embodiment of the present invention.

FIG. 4 is a flow diagram of one embodiment of a process 400 to discover and optimize paths in a network. In one embodiment, a path module performs process 400 to discover and optimize paths, such as path module 332 of FIG. 3 or path module 214 of FIG. 2 above. In FIG. 4, process 400 begins by discovering devices and the device characteristics in the network at block 402. In one embodiment, the network includes multiple network devices and other nodes interconnected by multiple links, with one or more equal cost segment groups that are used to communicate data between the network elements and other nodes. In addition, there may be an agent on or associated with the network elements. In this embodiment, the agents perform device discovery. In this embodiment, process 400 discovers the devices and the associated characteristics of those devices by the agents determine the characteristics of the corresponding device. The agents extract the device characteristics by using Application Programming Interface (API) calls to the device to retrieve the hardware configuration (e.g., name of the device, type of device (e.g., router, switch, or other type of device), device model, number of interfaces, types of interfaces, number of linecards, and/or other types of hardware configuration information) and the software configuration (e.g., routing information base (RIB), forwarding information base (FIB), access control lists (ACL), quality of service (QoS) information, virtual device configuration, service configuration(s), network address translation configuration, security configuration, performance metrics, and/or other types of software configuration). In another embodiment, the agents use a network service protocol to extract the device characteristics (e.g., Simple Network Management Protocol (SNMP), command-line scraping (e.g., capturing output of command line interfaces via programmatic means), and/or another type of network service protocol or technique.). The agents further have a unique identifier and report this information to process 400.

At block 404, process 400 identifies paths in the network. In one embodiment, process 400 identifies paths used across an equal cost segment group. As described above, which links are uses by which type of data is not determinable from a RIB or FIB for equal cost segment group, because the mechanism that a network element uses for selecting a link from an equal cost segment group is proprietary and non-configurable. In one embodiment, process 400 identifies paths by generating a variety of test traffic, transmitting the test traffic across the equal cost segment group, and determining which type of data was sent across which link of the equal cost segment group. Identifying the paths is further described in FIGS. 5A-B below.

Process 400 tests the paths at block 406. In one embodiment, process 400 uses the results from block 404 to determine a path to test. In this embodiment, process 400 selects a path for a service, client, server, or other device that is sensitive to the performance of an equal cost segment group. For example and in one embodiment, process 400 selects a path that is used for a high-speed trading service, where the service is sensitive to latency performance along the path. In this example, the path includes use of an equal cost segment group. Based on the results of identifying the path and the type of data used for the high-speed trading service, process 400 knows which link of the equal cost segment group is used for high-speed trading service. Process 400 generates the test data that will utilize the high-speed trading service path and injects this data into the network. In addition, process 400 records the results of the test and reports the results. Testing a path is further described in FIG. 6 below.

At block 408, process 400 optimizes the paths. In one embodiment, process 400 identifies an optimization for a path and instructs agents to configure corresponding network devices so as to implement the optimization. In one embodiment, process 400 optimizes the path by configuration forwarding-based policy decisions for the data communicated along the path. Optimizing a path is further discussed in FIG. 7 below.

Figure 5A:
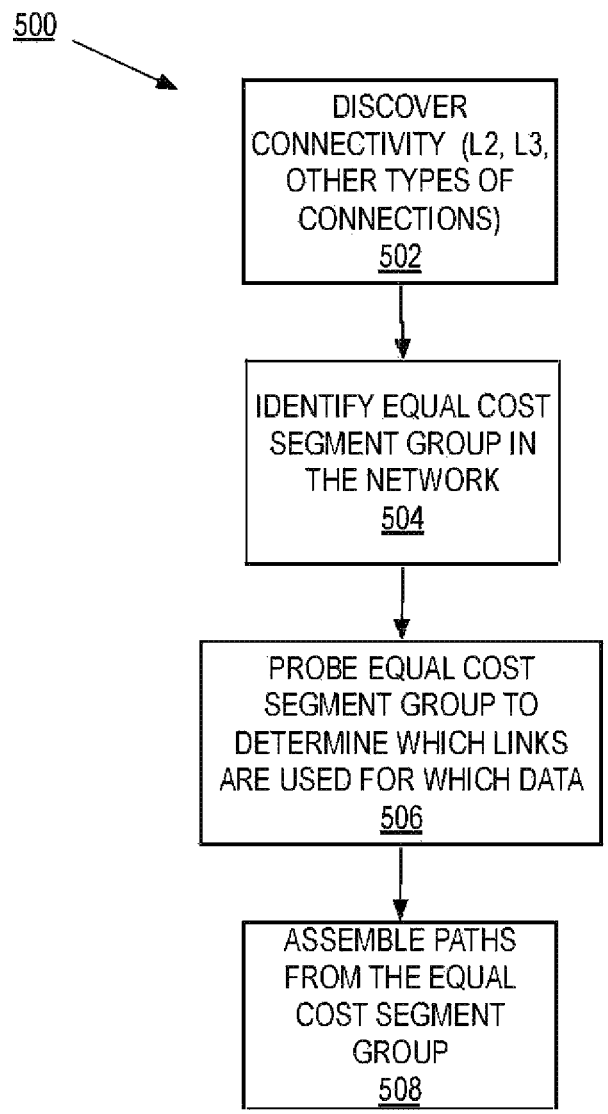
FIG. 5A is a flow diagram illustrating a process to discover paths in a network in accordance with an embodiment of the present invention.

FIG. 5A is a flow diagram of one embodiment of a process 500 to discover paths in a network. In one embodiment, a path module discovers the paths in a network, such as path module 332 of FIG. 3 or path module 214 of FIG. 2 above. In FIG. 5A, process 500 begins by discovering the connectivity of a network element at block 502. In one embodiment, process 500 discovers the connectivity by interrogating the configuration of the network element, such as the RIB, FIB, or other types of configuration information.

At block 504, process 500 identifies an equal cost segment group from the connectivity information associated with the network element. In one embodiment, an equal cost segment group is a part of the network that includes multiple paths between the same endpoints of the paths and the cost to transmit data across these paths is the same. In one embodiment, cost of the paths can be measured in a variety ways. An equal cost segment group can be, for example, an equal cost multipath (ECMP) or a link aggregate group (LAG). In this embodiment, process 500 identifies the equal cost segment group associated with the network element by interrogating the configuration information of the network element. For example and in one embodiment, the equal cost segment is an entry in a FIB and/or RIB of the network element.

Process 500 probes the identified equal cost segment group to determine which links of the equal cost segment group are used for which type of data at block 506. In one embodiment, process 500 generates a variety of test data, injects this test data for transmission across the equal cost segment group, and receives results of the test data to determine the link utilization of the equal cost segment. Identifying the equal cost segment group usage is further described in FIG. 5B below.

At block 508, process 500 assembles the paths from the equal cost segment group. In one embodiment, a path is a series of one or more links between two end devices in the network and the protocols used to communicate data on that link. The path may further include a selection of one or more links from an equal cost segment group. For example and in one embodiment, a path from client(s) 308 to compute node 310 is compute traffic path 320 as described in FIG. 3 above. In one embodiment, the path chosen is depended on the packet headers.

Figure 5B:
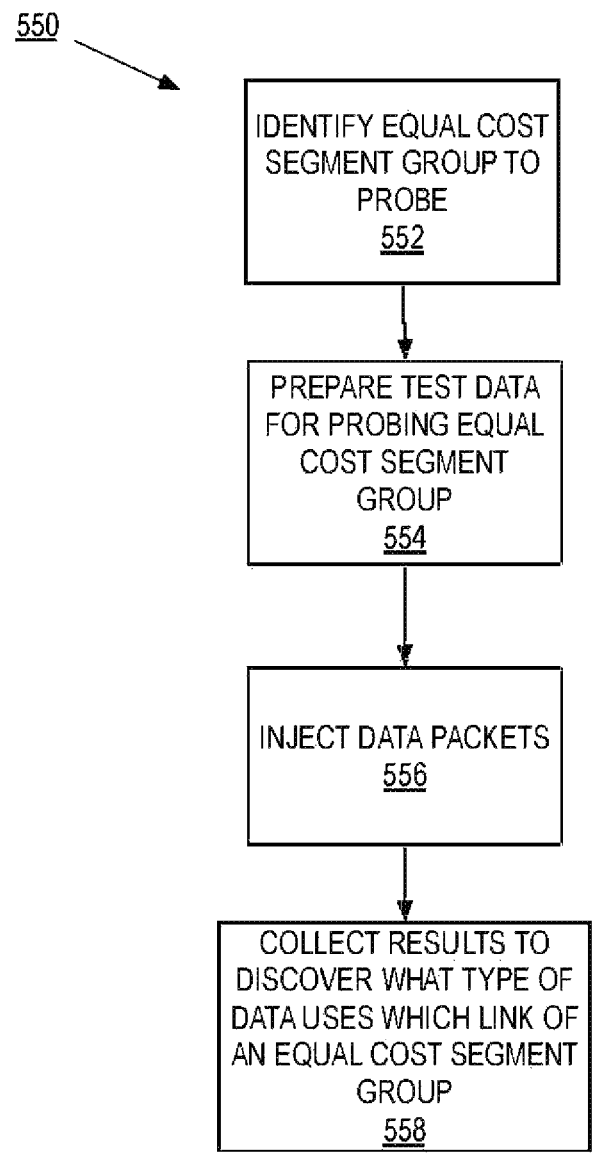
FIG. 5B is a flow diagram illustrating a process to determine equal cost segment link use in a network in accordance with an embodiment of the present invention.

FIG. 5B is a flow diagram of one embodiment of a process 550 to determine equal cost link use in a network. In one embodiment, the path module performs process 550 to equal cost segment link use, such as path module 332 of FIG. 3 or path module 214 of FIG. 2 above. In FIG. 5B, process 550 identifies the equal cost segment to probe. In one embodiment, process 550 receives an instruction to probe a particular equal cost segment on the network element associated with the agent performing process 550. In another embodiment, the equal cost segment group is identified by the agent during the path discovery process. Process 550 prepares test data for probing the equal cost segment group at block 554. In one embodiment, process 550 prepares the test data by creating multiple test data packets with a variety of different packet characteristics. The different packet characteristics can be source address, destination address, port, VLAN characteristics, Ethernet information, protocol information, and/or other types of packet characteristics. For example and in one embodiment, with reference to FIG. 3 above, process 550 creates a range of test data packets with source addresses of client(s) 308, destination addresses for compute nodes 310A-B and storage node 312 and vice versa. In addition, process 550 may also create test data packets with ports corresponding to the services on client(s) 308, compute nodes 310A-B, and/or storage node 312. In one embodiment, process 550 creates test data packets associated with the clients and services in network 300 (e.g., configured services, subnets, DSCP bits, VLAN tags, and/or other types of packet characteristics. In another embodiment, process 550 creates different types of test data packets not related to a current configuration of the network.

At block 556, process 550 injects the test data packets into the network. In one embodiment, by injecting the test data packets, the network element associated with process 550 transmits the test data packet across the different links of the equal cost segments. In this embodiment, for each of the test data packets, the network element selects the link of the equal cost segment group to transmit that test data packet and transmits this test data packet on that link. For example and in one embodiment, with reference to FIG. 3 above, process 550 injects test data packet at switch 302A to probe ECMP group 316. In addition, process 550 injects test data packet at spine 306A to probe ECMP group 316. Probing an equal cost segment on either end of that segment can yield different results, especially if the network elements use different selection mechanism for transmitting data on an equal cost segment group (e.g., network elements with different vendors, different firmware revision, different operating system version, and/or different types of). In one embodiment, process 550 can inject once copy of the test data packets or can inject multiple copies of the test data packets.

Process 550 collects the test results to discover what type of data uses which link on the equal cost segment group at block 558. In one embodiment, process 550 measures the test data packets received on the equal cost segment. In this embodiment, the test data packets include a high resolution timestamp indicating when they were generated. By recording this measurement, process 550 determines the type of data that is transmitted on each link of the equal cost segment. This gives an indication of the selection mechanism used by the transmitting network element. For example and in one embodiment, if a test data packet with a destination address of the compute node 310A and source address with one of the client(s) was received on 40-gigabit link 318B, process 550 would determine that data with these characteristics is selected to be transmitted on the 40-gigabit link 318B.

Figure 6:
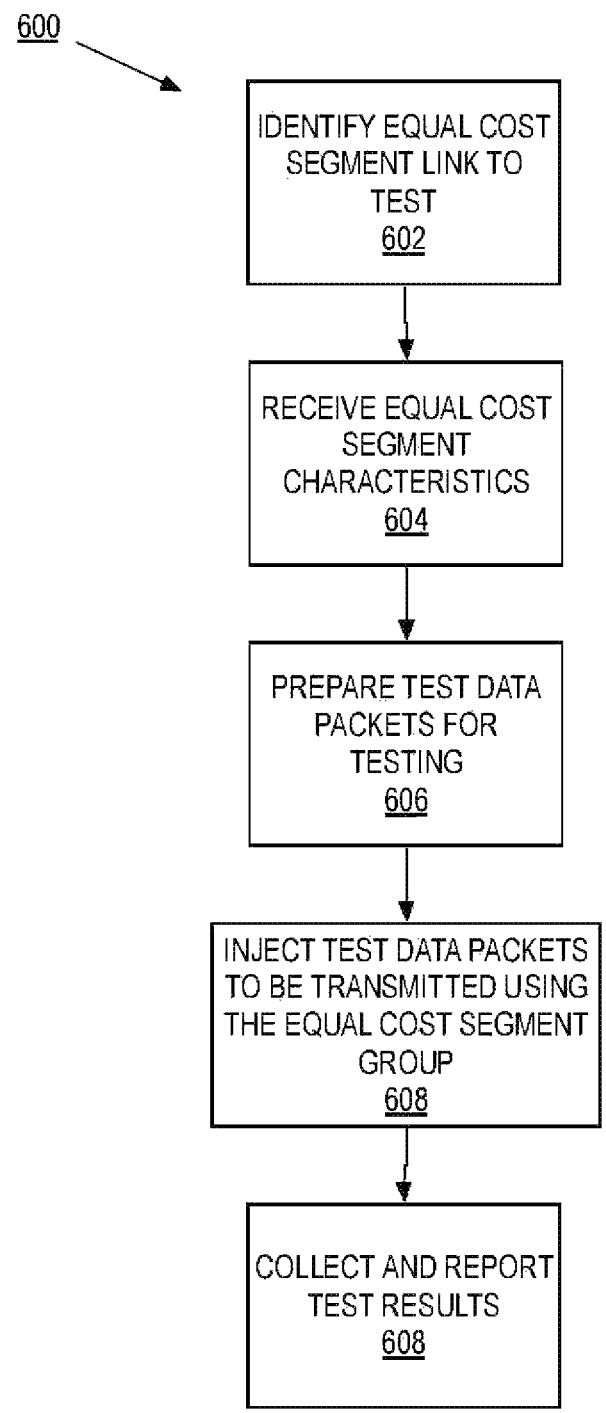
FIG. 6 is a flow diagram illustrating a process to test a path in a network in accordance with an embodiment of the present invention.

As described above, how links are utilized in an equal cost segment group can be discovered by transmitting test data packets across the equal cost segment. With the discovered link utilization information, each of the links of an equal cost segment group can be selectively tested to determine performance of that link. FIG. 6 is a flow diagram of one embodiment of a process 600 to test a path in a network. In one embodiment, a path module tests a path in the network, such as path module 332 of FIG. 3 or path module 214 of FIG. 2 above. In FIG. 6, process 600 begins by identifying a link on an equal cost segment group to test at block 602. In one embodiment, process 600 can select test one, some, or all of the links of the equal cost segment group. At block 604, process 600 receives the equal cost segment group characteristics. In one embodiment, the equal cost segment group characteristics include the indications of the equal cost segment link selection mechanism for one or more of the network elements that transmit data using this equal cost segment group. For example and in one embodiment, the equal cost segment characteristics includes that data tagged as best effort is transmitted on the 40-gigabit Ethernet link 318A of ECMP group 316 and assured forwarding assured data is transmitted on the 40-gigabit Ethernet link 318B.

At block 606, process 600 prepares the test data packets to be used for the equal cost segment group segment testing. In one embodiment, process 600 creates the test data packets that will be transmitted on the segment(s) to be tested. For example and in one embodiment, to test the ECMP links used for the compute traffic path 320 as described in FIG. 3 above, process 600 creates test data packets that will be selected to use the 40-gigabit Ethernet link 318B. Process 600 injects the test data packets to be transmitted by the network element using the equal cost segment at block 608. In one embodiment, process 600 can inject the traffic at either end of the equal cost segment group segments. For example and in one embodiment, process 600 can inject traffic at either switch 302A or spine 306A to test the 40-gigabit Ethernet link 318B. At block 610, process 600 collects and reports the test results. In one embodiment, each of the test data packets includes a high resolution timestamp indicating when they were generated.

Figure 7:
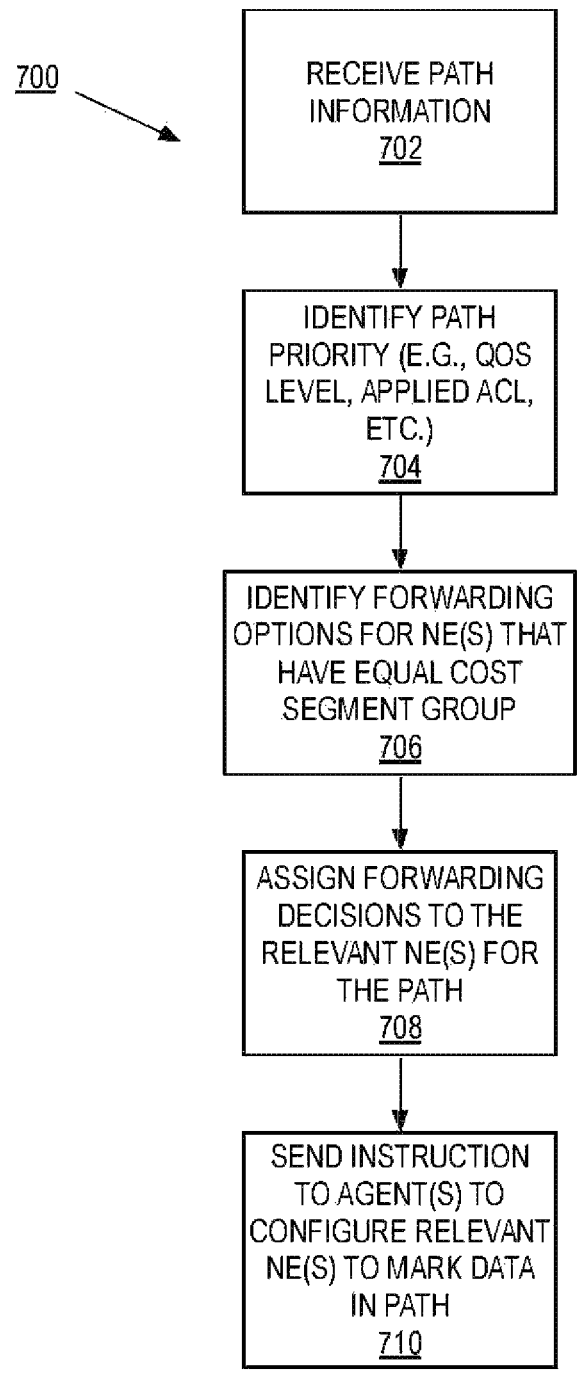
FIG. 7 is a flow diagram illustrating a process to optimize a path in a network in accordance with an embodiment of the present invention.

FIG. 7 is a flow diagram of one embodiment of a process 700 to optimize a path in a network. In one embodiment, a path module optimizes a path such as path module 332 of FIG. 3 or path module 214 of FIG. 2 above. In FIG. 7, process 700 begins by receiving the path information at block 702. In one embodiment, the path information is the series of links along the path and the protocols used to communicate the data on each link. In addition, the path information may include other types of information (e.g., priority information (QoS level parameters), security information (e.g., ACL parameters), and other types of information that affects how the data gets processed and/or forwarded along the path). In particular, the path information can includes information regarding one or equal cost segment groups between the endpoints of the device. In this embodiment, an equal cost segment group is an equal cost segment group is a part of the network that includes multiple paths between the same endpoints of the paths and the cost to transmit data across these paths is the same. For example and in one embodiment, compute traffic path 320 in FIG. 3 has multiple equal cost segments between switch 302A and compute node 310A. In this example, one segment is from switch 302A to spine 306A via 40-gigabit Ethernet link 318B to switch 302D and to compute node 310A. Another segment is from switch 302A to spine 306A via 40-gigabit Ethernet link 318A to switch 302B and to compute node 310A. Each of these segments has the same cost to transport data between the switch 302A and the compute node 310A.

At block 704, process 700 determines the priority level of this path. In one embodiment, a priority level of the path can depend on the type of configuration applied to the path. A higher priority path may have a higher level of QoS configured for the transmission of the data that uses the path (e.g., data along this path is marked with a DSCP bit of "assured forwarding"). Alternatively, a lower priority path may have no QoS assigned to the path or be assigned with a "best effort" designation.

Process 700 identifies forwarding options for the path for network element(s) that have equal cost segments at block 706. In one embodiment, process 700 determines from the path information, that the path include an equal cost segment group, such as ones described in FIG. 3 above. In this embodiment, process 700 identifies the network element(s) that are the decision nodes for using one of the equal cost segments. For example and in one embodiment, and referring to the compute traffic path 320 of FIG. 3 above, switch 302A is a decision node to use one of the ECMP group links for data being transmitted from switch 302A to spine 306A. In addition, spine 306A is decision node to use one of the switches 302B-D for data being transmitted from switch 302A to compute node 310A. Spine 306A is also a decision node to use one of the ECMP group links for data being transmitted from spine 306A to switch 302A. Thus, a network element can have equal cost segments for multiple directions.

At block 708, process 700 assigns forwarding decisions to the network element(s) for a path. In one embodiment, process 700 assigns forwarding decisions by determining policy-based forwarding decisions for the network element(s) identified with equal cost segments. In this embodiment, process 700 selects an equal cost segment for the path at one or more of the network element(s) that use an equal cost segment group. For example and in one embodiment, for the compute traffic path 320 as described in FIG. 3 above, process 700 determines one of the ECMP group 316 links and one of the switches to use for the compute traffic path 320. In this example, process 700 determines to use 40-gigiabit Ethernet link 318B and switch 306D for data being communicated from client(s) 308 to compute node 310A. In addition, process 700 determines to use 40-gigiabit Ethernet link 318B for data being communicated from compute node 310A to client(s) 308.

In addition, process 700 creates instructions for the agent (s) to configure the corresponding network element(s) so as to setup the policy-based forwarding decisions. In one embodiment, the agent(s) receive the instructions and configure the corresponding network element(s) to use specific equal cost segments for a path. For example and in one embodiment, for the compute traffic path 320 as described in FIG. 3 above, process 700 sends instructions to switch 302A and spine 306A to use 40-gigiabit Ethernet link 318B and switch 306D for data being communicated from client(s) 308 to compute node 310A and to use 40-gigiabit Ethernet link 318B for data being communicated from compute node 310A to client(s) 308. With the configured path, data is communicated along the specific equal cost segments.

As described above, the network elements can make the policy-based forwarding decisions based metadata included in the data (e.g., a DSCP bit, source address, destination address, port, VLAN characteristics, Ethernet information, protocol information, and/or other types of packet characteristics). In one embodiment, process 700 sends instructions to an agent to configure the device to mark the data, so that the data is communicated along the configured path. In this embodiment, the agent can configure the device that originates the data (e.g., the client or compute node) or a device that forwards the data along the path (e.g., a switch or router). For example and in one embodiment, process 700 can send instructions to an agent on the client(s) 308 and/or compute node 310A to mark the data originated by the theses device, such that the data communicated along compute traffic path 320. In this example, the data can be marked with a particular DSCP bit (e.g., "assured forwarding" class of traffic), and/or another type of data marking (e.g., VLAN tag).

Figure 8:
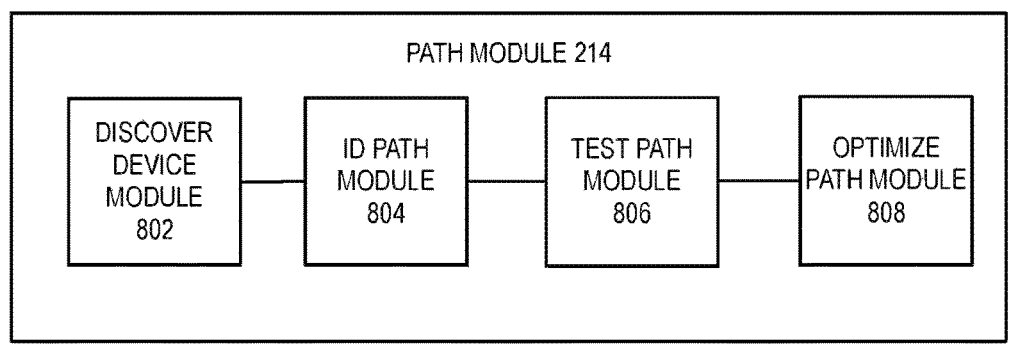
FIG. 8 is a block diagram of a path module that discovers and optimizes paths in a network in accordance with an embodiment of the present invention.

FIG. 8 is a block diagram of path module 214 that discovers and optimizes paths in a network. In one embodiment, FIG. 8 is also a block diagram of path module 332. In one embodiment, the path module 214 includes discover device module 802, identify path module 804, test path module 806, and optimize path module 808. In one embodiment, the discover device module 802 discovers the devices as described in FIG. 4 above. The identify path module 804 identifies the paths as described in FIGS. 5A-B above. The test path module 806 tests the paths as described in FIG. 6 above. The optimize path module 808 optimizes the paths as described in FIG. 7 above.

Figure 9A:
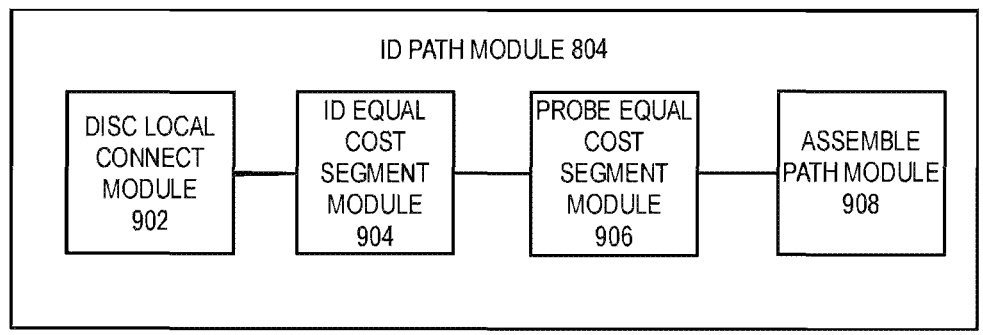
FIG. 9A is a block diagram of an identify path module that discovers paths in a network in accordance with an embodiment of the present invention.

FIG. 9A is a block diagram of identify path module 804 that discovers paths in a network. In one embodiment, the identify path module 804 includes a discover local connections module 902, identify equal cost segment module 904, probe equal cost segment module 906, and assemble module 908. In one embodiment, the discover local connections module 902 discovers the local connections as described in FIG. 5A, block 502 above. The identify equal cost segment module 904 identify the equal cost segment group as described in FIG. 5A, block 504 above. The probe equal cost segment module 906 probes the equal cost segment group as described in FIG. 5A, block 506 above. The assemble module 908 assembles the paths as described in FIG. 5A, block 508 above.

Figure 9B:
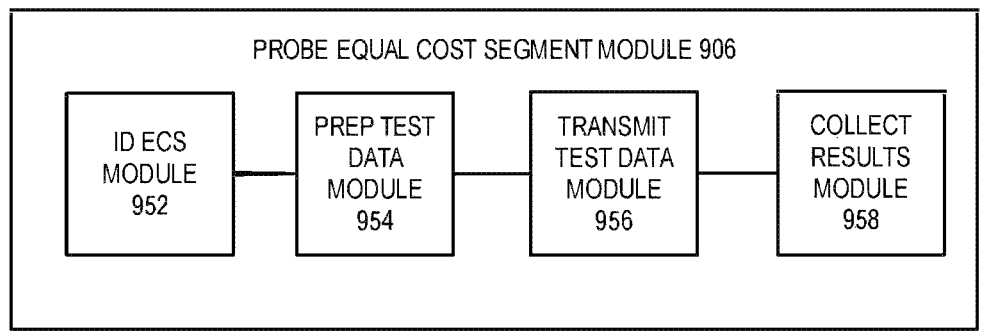
FIG. 9B is a block diagram of a probe equal cost segment module that probes an equal cost segment in accordance with an embodiment of the present invention.

FIG. 9B is a block diagram of probe equal cost segment module 906 that probes an equal cost segment. In one embodiment, the probe equal cost segment module 906 includes an identify equal cost segment module 952, prepare test data module 954, transmit test data 956, and collect results 958. In one embodiment, the identify equal cost segment module 952 identifies the equal cost segment group to be probed as described in FIG. 5B, block 552 above. The prepare test data module 954 prepares the test data as described in FIG. 5B, block 554 above. The transmit test data 956 transmits the test data as described in FIG. 5B, block 556 above. The collect results 958 collects the results as described in FIG. 5B, block 558 above.

Figure 10:
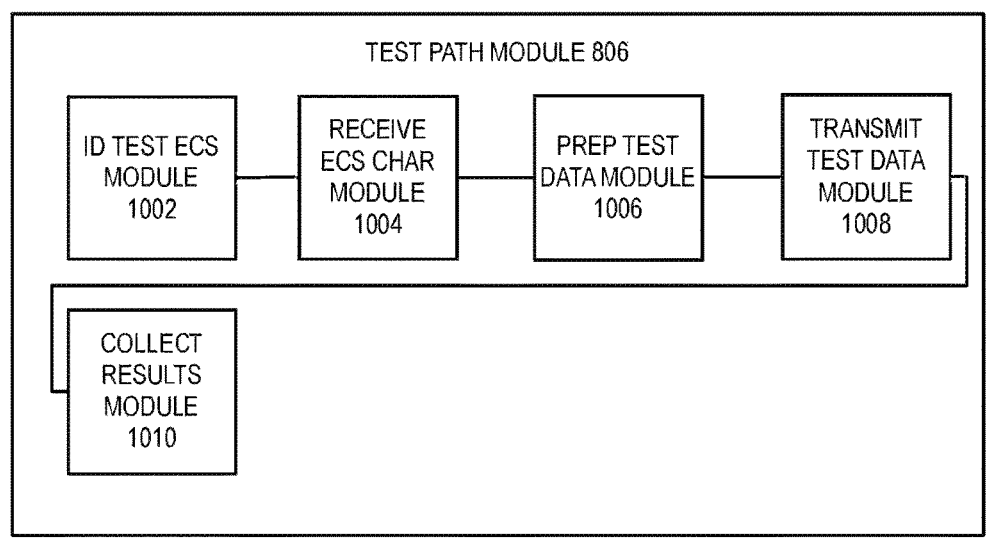
FIG. 10 is a block diagram of test path module that probes a path in a network.

FIG. 10 is a block diagram of test path module 806 that probes a path in a network. In one embodiment, the test path module 806 includes identify test equal cost segment module 1002, receive equal cost segment characteristics module 1004, prepare test data module 1006, transmit test data module 1008, and collect results module 1010. In one embodiment, the identify test equal cost segment module 1002 identifies the equal cost segment group to be tested as described in FIG. 6, block 602 above. The receive equal cost segment characteristics module 1004 receives the equal cost segment characteristics as described in FIG. 6, block 604 above. The prepare test data module 1006 prepares the test data as described in FIG. 6, block 606 above. The transmit test data module 1008 transmits the test data as described in FIG. 6, block 608 above. The collect results 1010 collects the results as described in FIG. 6, block 610 above.

Figure 11:
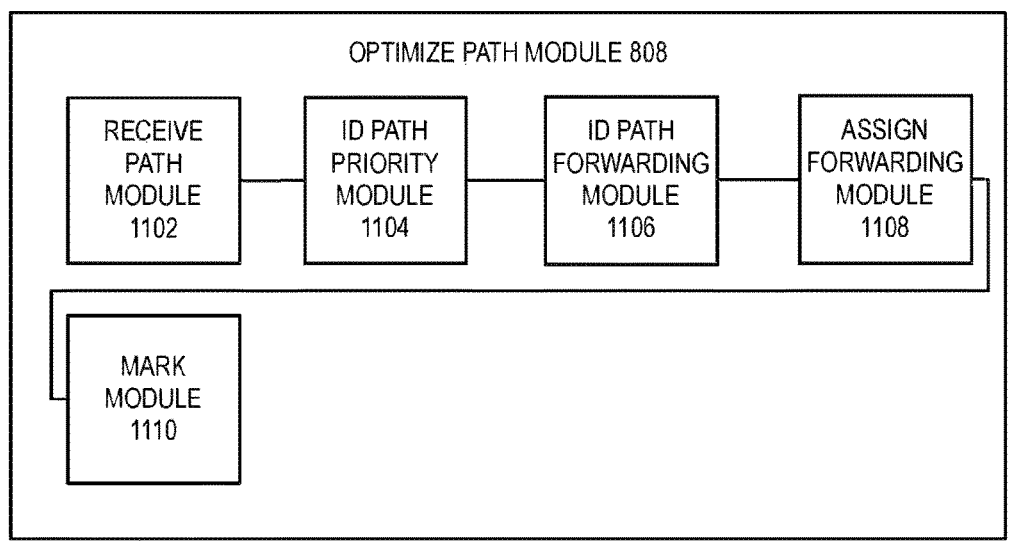
FIG. 11 is a block diagram of an optimize path module that optimizes a path in a network in accordance with an embodiment of the present invention.

FIG. 11 is a block diagram of optimize path module 808 that optimizes a path in a network. In one embodiment, the test path module 806 includes receive path module 1102, identify path priority module 1104, identify path forwarding module 1106, assign path forwarding module 1108, and mark module 1110. In one embodiment, the receive path module 1102 receives the paths as described in FIG. 7, block 702 above. The identify path priority module 1104 identifies the path priority as described in FIG. 7, block 704 above. The identify path forwarding module 1106 identifies the path forwarding characteristics as described in FIG. 7, block 706 above. The assign path forwarding module 1108 assigns the path forwarding characteristics as described in FIG. 7, block 708 above. The mark module 1110 configures the data marking as described in FIG. 7, block 710 above.

Figure 12:
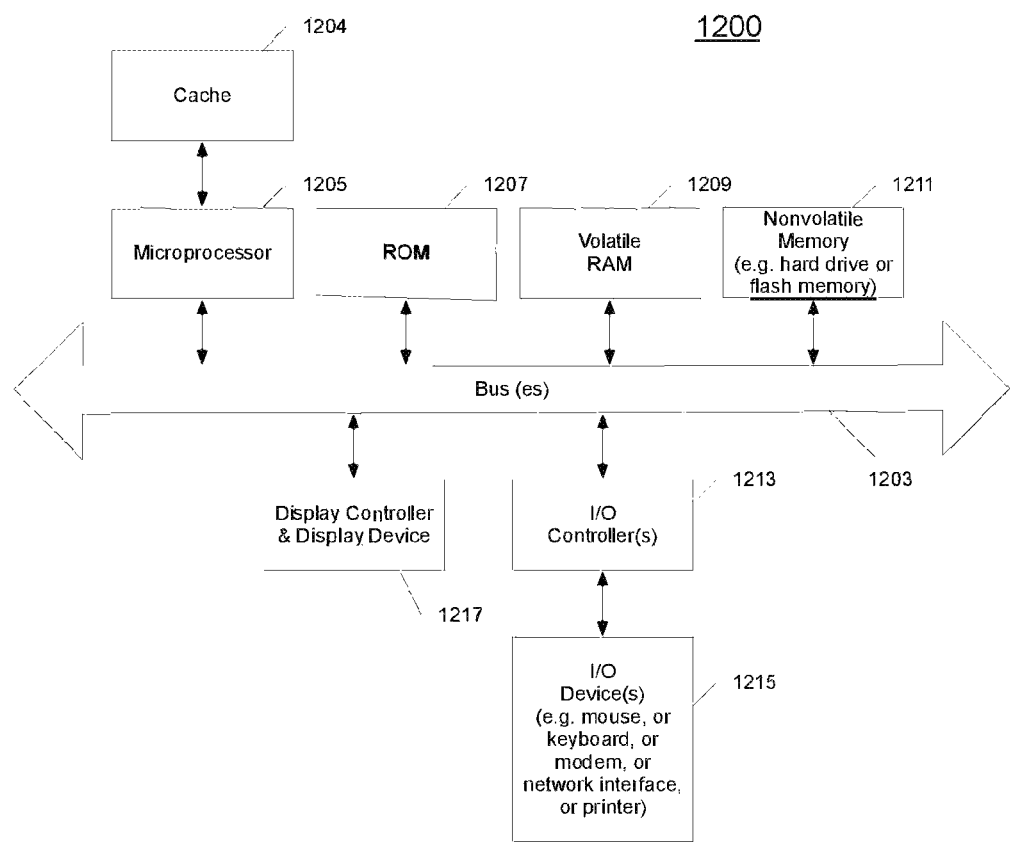
FIG. 12 illustrates an example of a typical computer system, which may be used in conjunction with the embodiments described herein.

FIG. 12 shows one example of a data processing system 1200, which may be used with one embodiment of the present invention. For example, the system 1200 may be implemented including a network element 106A-E as shown in FIG. 1 and/or network controller as shown in FIGS. 2 and 3. Note that while FIG. 12 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 12, the computer system 1200, which is a form of a data processing system, includes a bus 1203 which is coupled to a microprocessor(s) 1205 and a ROM (Read Only Memory) 1207 and volatile RAM 1209 and a non-volatile memory 1211. The microprocessor 1205 may retrieve the instructions from the memories 1207, 1209, 1211 and execute the instructions to perform operations described above. The bus 1203 interconnects these various components together and also interconnects these components 1205, 1207, 1209, and 1211 to a display controller and display device 1215 and to peripheral devices such as input/output (I/O) devices which may be mice, keyboards, modems, network interfaces, printers and other devices which are well known in the art. Typically, the input/output devices 1215 are coupled to the system through input/output controllers 1217. The volatile RAM (Random Access Memory) 1209 is typically implemented as dynamic RAM (DRAM), which requires power continually in order to refresh or maintain the data in the memory.

The mass storage 1212 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1212 will also be a random access memory although this is not required. While FIG. 12 shows that the mass storage 1212 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1203 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "retrieving," "receiving," "determining," "applying," "sending," "forwarding," "detecting," "adding," "communicating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:
    obtaining, by a first agent associated with a first packet forwarding device of a network, configuration data of the first packet forwarding device on behalf of a network controller of the network;
    obtaining, by a second agent associated with a second packet forwarding device of the network, configuration data of the second packet forwarding device on behalf of the network controller;

discovering, by the network controller, existence of a plurality of equal cost links coupling the first packet forwarding device and the second packet forwarding device based on the configuration data of the first packet forwarding device and the configuration data of the second packet forwarding device;

for each equal cost link of the plurality of equal cost links, identifying, by the network controller, a type of packet the equal cost link is used to transport and a performance metric of the equal cost link by:

causing the first agent to probe the equal cost link by causing the first packet forwarding device to transmit a variety of test data having different packet characteristics including one or more of a source address, a destination address, a source port number, a destination port number, a virtual local area network (VLAN) tag, a virtual extension local area network (VxLAN) tag, differentiated services code point (DSCP) bits and protocol information, wherein the type of packet is represented by specific values of the packet characteristics;

causing the second agent to record receipt of the test data by the second packet forwarding device; and determining the performance metric based on the received test data and timestamps contained within the received test data.

2. The method of claim 1, wherein functionality of the network controller is distributed between the first agent and the second agent.

3. The method of claim 1, wherein the configuration data of the first packet forwarding device and the configuration data of the second packet forwarding device includes one or more of a hardware configuration, a software configuration, access control lists (ACLs), quality of service (QoS) information, a virtual device configuration, service configurations, a network address translation (NAT) configuration, a security configuration, and a forwarding configuration of the first packet forwarding device and the second packet forwarding device, respectively.

4. The method of claim 3, wherein the plurality of equal cost links is treated as a single logical link in the forwarding configuration of the first packet forwarding device.

5. The method of claim 4, wherein the plurality of equal cost links comprise an Equal Cost Multipath (ECMP) group or a Link Aggregation Group (LAG).

6. The method of claim 1, wherein the first agent is executing on the first packet forwarding device.

7. The method of claim 1, wherein the second agent is executing on the second packet forwarding device.

8. The method of claim 1, further comprising optimizing, by the network controller, a path across the plurality of equal cost links for data that traverses the plurality of equal cost links based on the identified performance metrics by causing one or more of the first packet forwarding device and the second packet forwarding device to update their respective forwarding policies.

9. The method of claim 8, wherein said optimizing is further based on one or more of priority information and security information of the configuration data of the first packet forwarding device or the configuration data of the second packet forwarding.

10. The method of claim 9, wherein the priority information comprises Quality of Service level parameters of the configuration data of the first packet forwarding device or configuration data of the second packet forwarding device.

11. The method of claim 10, wherein the first packet forwarding device comprises a first switch and the second packet forwarding device comprises a second switch.

12. The method of claim 1, further comprising optimizing, by the network controller, a path across the plurality of equal cost links for data that traverses the plurality of equal cost links based on the identified performance metrics by causing one or more intermediate packet forwarding devices between the first packet forwarding device and the second packet forwarding device to update their respective forwarding policies.

13. The method of claim 12, wherein the one or more intermediate packet forwarding devices comprise spine network elements.

14. A method comprising:

discovering, by a first agent running on a first network element of a plurality of network elements in a network or a second agent running on a second network element of the plurality of network elements, a plurality of equal cost links between the first network element and the second network element; and determining for each link of the plurality of equal cost links a type of packet the link is used to transport by probing a link selection mechanism of the first network element, including:

generating, by the first agent, a plurality of test data packets having a variety of different packet characteristics, wherein each of the plurality of test data packets has a different value for one or more of a source address, a destination address, a source port number, a destination port number, a virtual local area network (VLAN) tag, virtual extension local area network (VxLAN) tag, differentiated services code point (DSCP) bits and protocol information than all other of the plurality of test data packets;

causing, by the first agent, the plurality of test data packets to be transmitted to the second network element via the plurality of equal cost links; and determining a path for each test data packet of the plurality of test data packets by recording, by the second agent, on which link of the plurality of equal cost links the first network element used to transmit the test data packet.

15. The method of claim 14, wherein the plurality of equal cost links comprises an Equal Cost Multipath (ECMP) group or a Link Aggregation Group (LAG).

16. The method of claim 14, wherein the plurality of equal cost links is treated as a single logical link in a forwarding configuration of the first network element.

17. The method of claim 14, wherein the link selection mechanism according to which the first network element selects one of the plurality of equal cost links on which to transmit one of the plurality test data packets is not discoverable from configuration information of the first network element.

18. The method of claim 17, wherein the link selection mechanism is proprietary to a manufacturer of the first network element.

19. The method of claim 14, wherein said discovering comprises identifying the plurality of equal cost links based on a forwarding configuration of the first network element.

20. The method of claim 19, wherein the forwarding configuration comprises a forwarding information base or a routing information base.

* * * * *